United States Patent [19]
Ross et al.

[11] Patent Number: 5,987,467
[45] Date of Patent: Nov. 16, 1999

[54] METHOD OF CALCULATING TUPLES FOR DATA CUBES

[75] Inventors: Kenneth A. Ross, New York, N.Y.; Divesh Srivastava, New Providence, N.J.

[73] Assignees: AT&T Corp.; Columbia University, both of New York, N.Y.

[21] Appl. No.: 08/911,688

[22] Filed: Aug. 15, 1997

[51] Int. Cl.$^6$ .................................................. G06F 17/30
[52] U.S. Cl. .................................. 707/100; 707/2; 707/3; 707/5; 707/6; 707/7
[58] Field of Search .............................. 707/2, 3, 5, 6, 707/7, 100; 345/423

[56] References Cited

U.S. PATENT DOCUMENTS

| | | | |
|---|---|---|---|
| 5,799,300 | 8/1998 | Agrawal et al. | 707/5 |
| 5,822,751 | 10/1998 | Gray et al. | 707/3 |
| 5,832,475 | 11/1998 | Agrawal et al. | 707/2 |
| 5,890,150 | 3/1999 | Ushijima | 707/3 |
| 5,890,151 | 3/1999 | Agrawal et al. | 705/5 |
| 5,900,880 | 5/1999 | Cline et al. | 345/423 |

OTHER PUBLICATIONS

Graefe, "Query Evaluation Techniques for Large Databases", ACM Computing Surveys, vol. 25, No. 2, pp. 75–170, Jun. 1993.

Date, "Aggregate Functions", Database Programming & Design, pp. 17–19, Apr. 1996.

Goil et al., "Parallel Data Cube Construction for High Performance On–line Analytical Processing", IEEE, pp. 10–15, 1997.

Roussopoulos et al., "Cubetree: Organization of and Bulk Incremental Updates on the Data Cube", ACM, pp. 89–99, 1997.

"Data Cube: A Relational Aggregation Operator Generalizing Group–By, Cross–Tab, and Sub–Totals", J. Gray et al., Technical Report, MSR–TR–95–22, Microsoft Research. 1996.

"On Computing The Data Cube", S. Sarawagi et al. Research Report, IBM Almaden Research Center (no date).

"Implementing Data Cubes Efficiently", V. Harinarayan et al., SIGMOD '96 Jun. 1996 Montreal Canada.

"An Array–Based Algorithm For Simultaneous Multidimensional Aggregates", Y. Zhao et al., NSF grant IRI–9157357. (no date).

"On The Computation of Multidimensional Aggregates", S. Agarwal et al., Proceedings of the 22nd VLDB Conference, Mumbai(Bombay), India, 1996.

"Data Cube: A Relational Aggregation Operator Generalizing Group–By, Cross–Tab, and Sub–Totals", J. Gray et al., 1996 IEEE.

*Primary Examiner*—Wayne Amsbury
*Assistant Examiner*—Thuy Pardo

[57] ABSTRACT

A method and apparatus of calculating data cubes is shown in which a data set is partitioned into memory sized data fragments and cuboid tuples are calculated from the data fragments. A search lattice of the data cube is used as a basis for ordering calculations of lower dimensional cuboids in the data cube. Identification of a minimum number of paths through the lattice that is sufficient to traverse all nodes in the lattice is achieved by iteratively duplicating twice all paths in a lower dimensional space, distributing a new attribute to the first duplicate, moving end points from paths of the second duplicate to a corresponding path in the first duplicate and merging the first and second duplicates.

41 Claims, 4 Drawing Sheets

METHOD OF CALCULATING TUPLES FOR DATA CUBES

BACKGROUND OF THE INVENTION

The present invention relates to data cubes and methods of assembling data cubes from relational databases.

Data cubes represent an efficient data structure for analyzing large amounts of data. Often, practical advantages are obtained from analyzing raw data by a variety of data attributes or combinations of attributes. For example, a retail business may record data for every sales transaction the business completes. Significant advantages may be obtained by analyzing the recorded transactions to determine sales levels over time, by product, by geographic region or by a host of other attributes. Additionally, data may be analyzed by a combination of attributes instead of a single attribute. Data cubes are suited to such analysis.

Figure 1A:
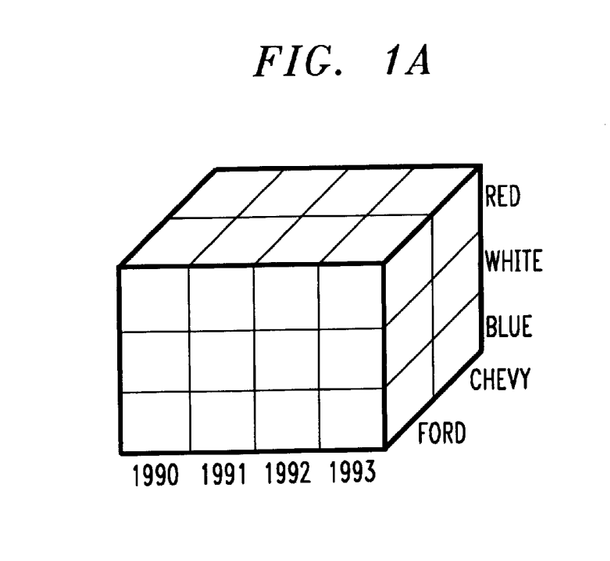
FIGS. 1(a) and 1(b) schematically represent data cubes and cuboids.

The data cube was first introduced in Gray, et al., *Data Cube: A Relational Aggregation Operator Generalizina Group-By, Cross-Tab, and Sub-Totals*, Proceedings of the IEEE International Conference on Data Engineering, pp. 152–159 (1996) ("Gray"). The data cube may be envisioned as an n dimensional cuboid having n-1 and lower dimensional aggregates based upon the cuboid. Gray provides an example of a three dimensional data cube, reproduced in FIG. 1, tailored to a relational database containing transactions for sales of automobiles. The data cube includes a three dimensional core cuboid, three two dimensional cuboids, three one dimensional cuboids, and a zero dimensional cuboid. In the three dimensional cuboid, auto sales are grouped by make, color and by year. Each entry ("tuple") within the core cuboid contains a value for total sales for a particular make, color and year. These three attributes, make, color and year, are required to identify the tuples in the core cuboid of FIG. 1(*a*).

Figure 1B:
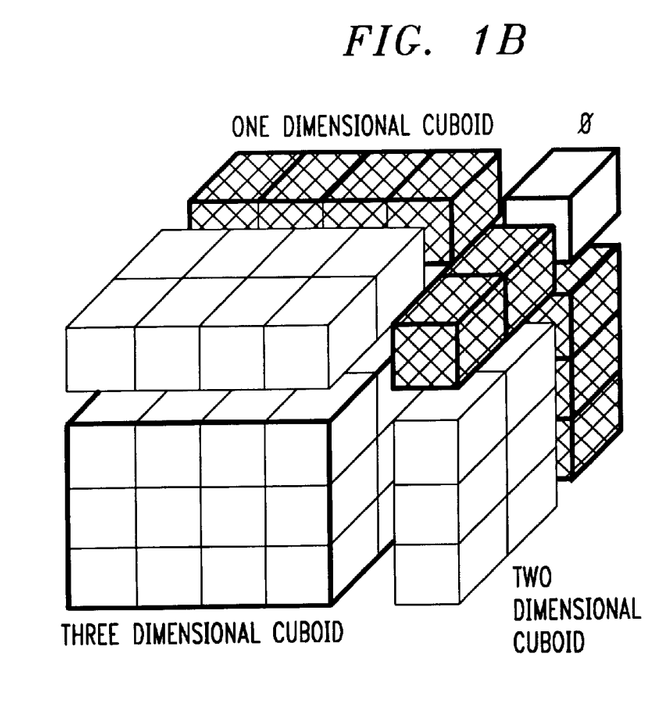

Lower dimensional aggregates reflect information from the database grouped by a fewer number of attributes than the tuples of the core cuboid. For example, a two dimensional data space, shown in FIG. 1(*b*), may be created to monitor sales by make and year, but across all colors. The two dimensional space is also a cuboid. The information contained within the two dimensional cuboid is derived from the information contained in the three dimensional cuboid. Further, a one dimensional cuboid may be created to monitor sales by year, across all makes and all colors. Again, the information contained within the one dimensional cuboid may be derived from the information contained in an adjacent two dimensional cuboid. Finally, a zero dimensional cuboid (a point cuboid) may be created from any adjacent one dimensional cuboid. In the example provided in Gray, the zero dimensional cuboid totals sales information across all makes, all colors and all years.

Virtually any type of data analysis may be performed to construct a data cube, not merely totaling. Accordingly, data cubes promise to be a very powerful means of analyzing large relational databases.

Costs associated with building data cubes are substantial. An n dimensional data cube possesses $2^n$ cuboids. Each cuboid may contain a number of tuples equal to the product of the number of values that each attribute takes within the database. For example, if a business analyzed 1997 sales by state and by week, a two dimensional data cube generated therefrom may possess as many as 2600 (50*52) tuples. It is easy to imagine additional attributes (product, payment type, etc.) that would increase the volume of the data cube geometrically. Thus, efficiencies in generating data cubes must be realized.

Figure 2:
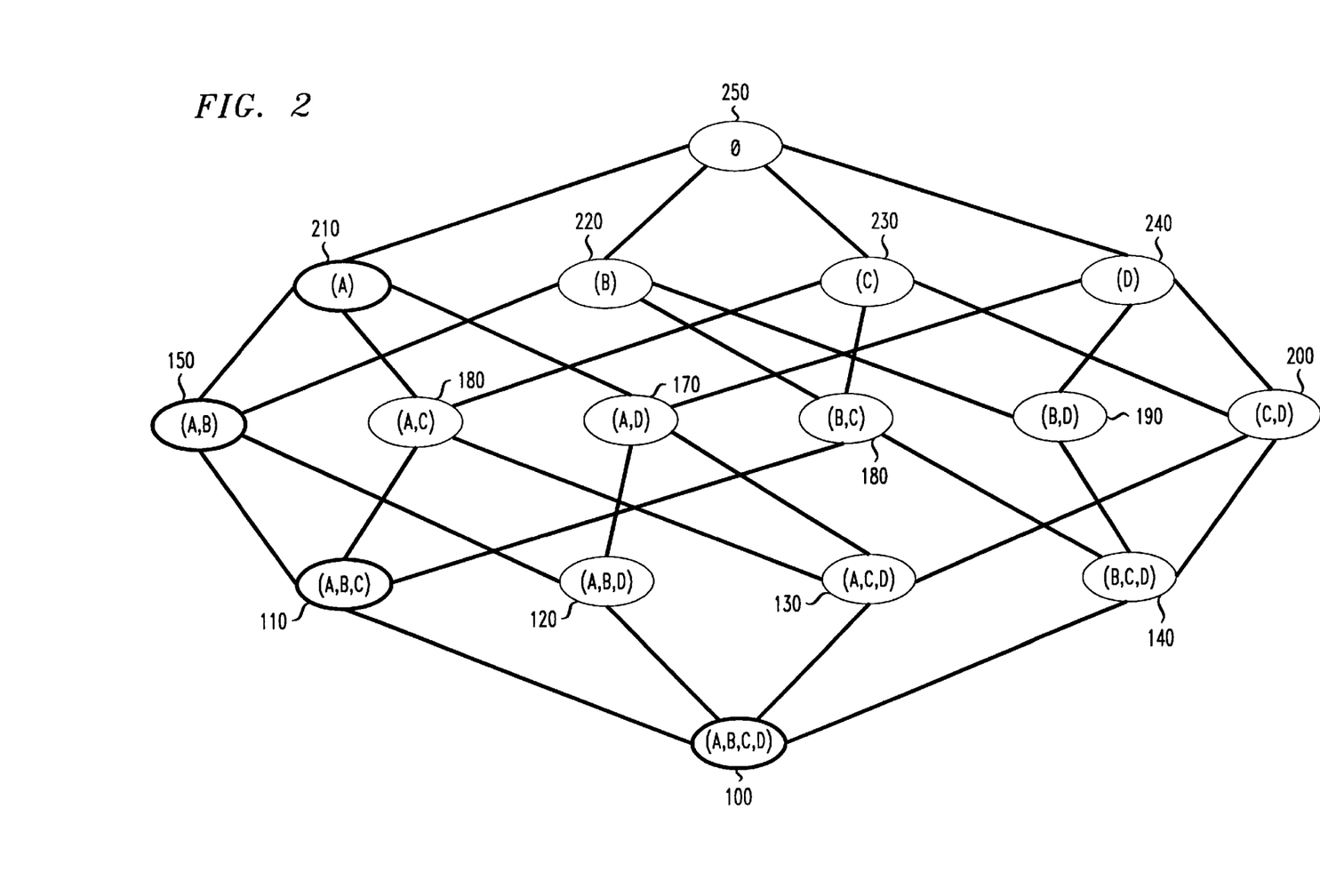
FIG. 2 is a lattice diagram for an exemplary four dimensional data cube.

Several techniques have been proposed to build data cubes. Many are predicated on search lattices which describe relationships among the cuboids of a data cube. An exemplary lattice is shown in FIG. 2 for a four dimensional data cube having attributes A, B, C, and D. Node (A,B,C,D) 100 references tuples of the core cuboid. Because four attributes are required to address tuples of that node, the (A,B,C,D) node 100 has the finest granularity. Conversely, node $\phi$250 is said to have coarsest granularity because it describes a cuboid tuple indexed by the least number of attributes (zero attributes). Intermediate nodes reference cuboid tuples that are indexed by an intermediate number of attributes.

Interconnecting lines shown in FIG. 2 describe relations among the various cuboids. Lower dimensional cuboids may be calculated from certain higher dimensional cuboids. Interconnecting lines identify those cuboids that may be calculated from others. For example, the (A,B,C) 110 and (A,B,D) 120 cuboids each may be calculated from the cuboid (A,B,C,D) 100. Thus, (A,B,C,D) 100 is a "parent" of (A,B,C) 110 and (A,B,D) 120; they are the parent's "children." Cuboids (A,B) 150 and (A,D) 170, in turn, are children of cuboid (A,B,D) 120. However, cuboid (A,C) 160 is not a child of (A,B,D) 120. Tuples of cuboid (A,B,D) 120 are not grouped by attribute C and, therefore, cannot provide information necessary for tuples grouped by attributes A and C.

Data cubes may be calculated by a variety of means. A first technique is proposed by Gray. First, Gray passes through a relational database and calculates tuples for a core cuboid, the finest granularity cuboid. For each record in the database R, an array cell indexed by the values of the "group by" attribute is updated based on data of the new record. Second, Gray calculates lower dimensional cuboids. Gray achieves that computational savings by calculating tuples of each cuboid from the smallest available parent cuboid. While (B,C) may be computed from either (A,B,C) or (B,C,D), Gray selects the smallest of these parents based on the number of tuples of each.

Gray's technique suffers performance disadvantages because the core cuboid must fit entirely in main memory; often Gray's technique is inapplicable to databases which contain sparse data. Sparseness occurs when a small percentage of the space of possible tuples are actually present in a data cube. Real world data is frequently very large and very sparse. Thus, Gray's technique is of limited value.

A second technique, called "Pipesort," is found in Agarwal, et al., *On the Computation of Multidimensional Aggregates*, Proceedings of the 22nd VLDB Conference (1996). Pipesort follows paths in the search lattice of the data cube. In the example of FIG. 2, the raw data may be sorted first in a first attribute order, such as A-B-C-D. Having sorted the data, cuboids sharing some part of the sort order may be calculated. These cuboids are said to have a "prefix" common to the sort order. In this example, (A,B,C,D), (A,B,C), (A,B), A and $\phi$ are calculated. The sort order chosen is based on estimates of computational complexity and an attempt to incorporate the smallest-parent objective of Gray. Once the first path is computed, Pipesort sorts the highest dimensional cuboid (A,B,C,D) based on a second sort order to pursue a second path. Pipesort may perform as few as $\binom{n}{\lfloor n/2 \rfloor}$ sorts, where n is the number of attributes for the data cube, but the number of sorts performed in practice is often much higher. Pipesort does not guarantee that it follows a minimum number of paths through the lattice.

Pipesort incurs high computational expenses. Often, the cuboid to be sorted does not fit entirely into a computer's on-board memory. By sorting the cuboid using the slower external memory, Pipesort incurs high input/output costs. In an n dimensional data cube, the input/output costs are exponential in n (i.e., $\cong 2^n$).

There is a need in the art for a method of computing data cubes efficiently with low expense. There is a need in the art for a method of computing data cubes that minimize read/write operations. Further, there is a need in the art for a method of computing data cubes utilizing sort paths that traverse a minimal number of paths through a lattice of the cube.

SUMMARY OF THE INVENTION

The present invention provides a method and apparatus for calculating data cubes with much lower computational expense. The invention calculates data cubes by partitioning the relational database by a first attribute into a plurality of data fragments and, for each data fragment that fits into main memory, computing cuboid fragments from the data fragment. Data cube computation on a fragment by fragment basis reduces computation costs considerably.

The present invention also reduces costs associated with computation of data cubes from data that fits into main memory by computing lower dimensional cuboids along a minimum number of paths through a search lattice of the data cube. Further, the present invention conserves computation costs by reusing sorted data whenever possible.

DETAILED DESCRIPTION

Figure 3:
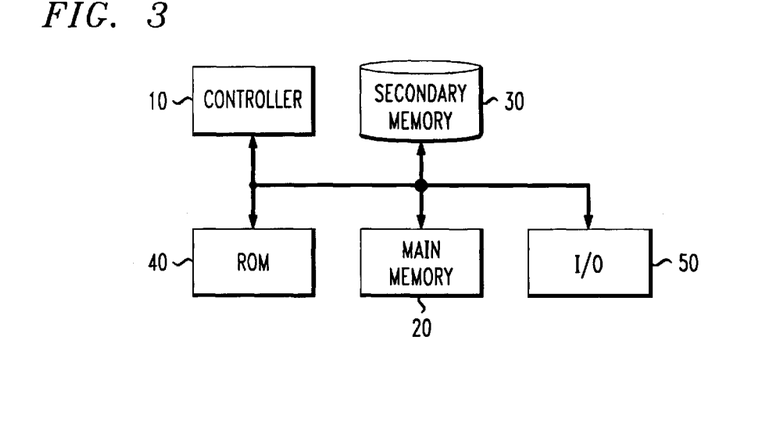
FIG. 3 is a system diagram of one embodiment of the present invention.

Turning first to FIG. 3, there is illustrated therein a system constructed in accordance with a first embodiment of the present invention. A controller 10 is provided in communication with main memory 20, secondary memory 30, and, optionally, ROM memory 40 and additional input/output devices 50.

Read/write operations between the controller 10 and main memory 20 may be performed at a greater speed and lower computational expense than similar operations between the controller 10 and secondary memory 30. Secondary memory 30, however, possesses a far greater data storage capacity than main memory 20. In a preferred embodiment, main memory 20 may be random access memory (RAM). Further, in a preferred embodiment, secondary memory 30 may be a magnetic or optical data storage device. Secondary memory 30 holds a relational database R (not shown).

The present invention achieves substantial improvements in the computation of data cubes through a combination of features:

It partitions a relational database into smaller data fragments that fit into memory and builds the data cube from the data fragments, and It minimizes main memory sort operations and conserves presorted data whenever possible.

These features, either alone or in tandem, provide advantages over previously known techniques for building data cubes. These features are described in turn below.

I. Partition the Database

The controller 10 calculates data cube tuples using an improved process that minimizes calculations and input/output expenses. The controller 10 examines a relational database from which the data cube is to be built and determines whether the database fits within main memory. If so, the controller calculates the tuples directly. If not, the controller partitions the database into memory sized data fragments and calculates cuboid fragments therefrom.

Figure 4:
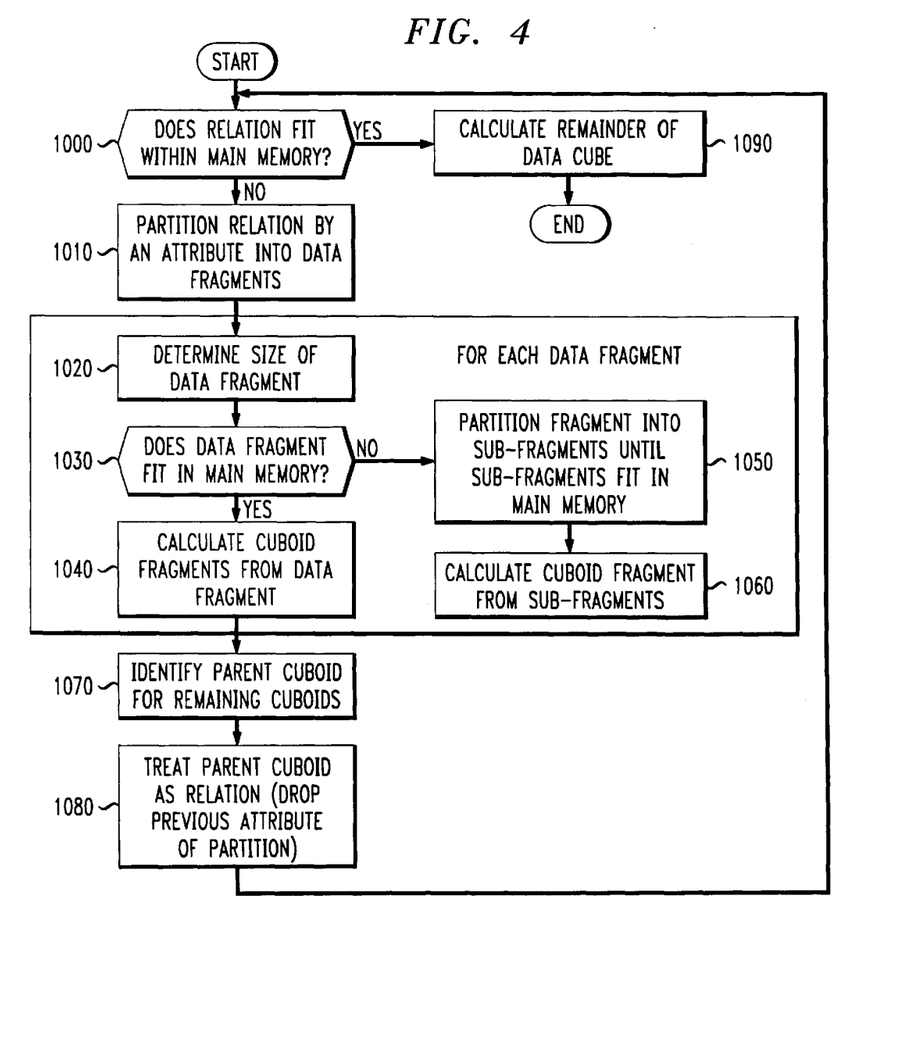
FIG. 4 is a flow diagram of operation of the controller of FIG. 3 according to a first embodiment of the present invention.

The operation of the controller 10 is shown in FIG. 4. The controller 10 examines the size of the relational database R and determines whether it can fit entirely within main memory 20 (Step 1000). If so, the controller 10 proceeds to calculate the entire datacube at Step 1090. If not, the controller 10 partitions the database R into data fragments based upon values of a first attribute and builds the data cube from the data fragments according to the operation shown in FIG. 4.

To partition the database, the controller 10 scans entries in the relational database R held in secondary memory 30 and partitions the database into data fragments based upon values of a first attribute (Step 1010). To build a four dimensional data cube having attributes A, B, C and D, the controller 10 may partition the database based on values of A. Each data fragment partitioned by the first attribute contains data of the attributes for grouping, such as A, B, C, and D, and the data necessary to complete the tuples of the data cube, such as sales information in the example of FIG. 1. Data of each data fragment is related by the values of the first attribute. For example, if the database were partitioned by discrete values of A, one data fragment may be created containing every record where A=1 and a second data fragment would be created containing every record where A=2. However, data fragments need not be created based on discrete values of the partition attribute. For example, data fragments may be created based on ranges on the attribute (i.e. 1<A<5, 6<A<10, . . .). Every record of the database R is represented by a record in one of the data fragments.

For each data fragment, the controller 10 examines the fragment's size (Step 1020). The controller 10 determines whether the data fragment will fit entirely within main memory (Step 1030). If so, the controller 10 loads the data fragment from secondary memory 30 into main memory 20 and begins the operation to calculate cuboid fragments from the data fragment (Step 1040). If not, the controller partitions the data fragment into sub-fragments (Step 1050).

Figure 5:
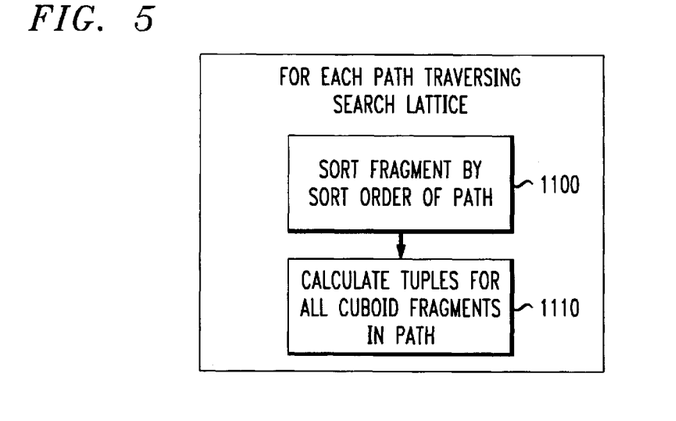
FIG. 5 is a flow diagram of operation of the controller at steps 1040, 1060 and 1090 of FIG. 4.

A cuboid fragment is a portion of a cuboid that may be computed from a data fragment. If the first data fragment contains a partition value $A=A_1$ and the fragment contains data from the relational database, the controller may calculate from that data fragment a part of the core cuboid and fragments of lower dimensional cuboids for tuples indexed by $A=A_1$. To calculate the cuboid fragments, the controller 10 sorts the data fragment by an order of attributes designating a path through the search lattice of the data cube. (FIG. 5, Step 1100). In the example of a four dimensional data cube, illustrated in FIG. 2, the controller 10 may sort the data fragment by the order A-B-C-D. Once sorted, the controller 10 passes through the sorted data fragment and calculates tuples for cuboid fragments at all granularities referenced by the prefix of the sort order (Step 1110). For a data fragment sorted in the order A-B-C-D, the controller 10 calculates tuples for the cuboid fragments (A,B,C,D), (A,B,C), (A,B) and (A) in one pass through the data fragment A=A$_1$. This path is shown bolded in FIG. 2. At the conclusion of the first pass, all cuboid fragments sharing a common prefix with the sort order are calculated. When these cuboid fragments are calculated, the controller 10 may write them to secondary memory 30.

At the conclusion of the first pass through the data fragment, not all cuboid fragments have been calculated from the data fragment. For example, after the fragments for cuboids (A,B,C,D), (A,B,C), (A,B) and (A) are calculated, the controller 10 must calculate fragments for cuboids (A,B,D), (A,C,D), (A,C) and (A,D). Accordingly, the controller 10 resorts the data fragment according to an attribute order of another path, for example, by A-C-D (Step 1100). The controller 10 then calculates uncalculated cuboid fragments having a prefix common to the second sort order, for example, (A,C,D) and (A,C) (Step 1110). Of course, it would be possible to calculate cuboid fragment (A) from the second sort order. However, (A) is not included in the second path because the cuboid fragments were calculated from the first sort; calculating them a second time would only waste resources. The process of sorting the data fragment and calculating tuples for cuboid fragments repeats until all cuboids that are indexed by the first value of the partition attribute are calculated. In the example provided in FIG. 2, the cuboid fragments (A$_1$,B,C,D), (A$_1$,B,C), (A$_1$,B,D), (A$_1$,C,D), A$_1$,B), (A$_1$,C), (A$_1$,D), and (A$_1$) will have been calculated from the first data fragment partitioned by A$_1$.

As noted above, the controller 10 calculates cuboid fragments based upon the data fragment if the data fragment fits within main memory. If the controller determines at step 1030 that the data fragment does not fit within main memory 20, the controller 10 performs a second partition operation on the oversized data fragment based upon a second partition attribute (FIG. 4, Step 1050). Using the example of FIG. 2, where the relational database is partitioned by attribute A, assume that data fragment A$_4$ is too large to fit within main memory 20. In that event, the controller 10 partitions data fragment A$_4$ by a second attribute, for example, attribute B. A plurality of sub-fragments are created from this partition operation. Data within each sub-fragment are related by A$_4$ and B values. The controller sorts and computes the cuboid fragments of the oversized data fragment based on the data of the sub-fragments using the computation procedure of FIG. 5 applied to each sub-fragment (Step 1060).

In the event that a sub-fragment is too large to fit within main memory 20, the controller 10 partitions sub-fragments recursively until the partitions create data fragments small enough to fit within main memory 20 (Step 1050). Partitioning by additional attributes is not performed on every data fragment, only those that are too large to fit within main memory 20.

When all cuboid fragments for the first value of the partition attribute are calculated, cuboid fragments are calculated from the other data fragments using the above process. When all data fragments are exhausted, all tuples of the core cuboid (A,B,C,D) are calculated. Further, tuples of all cuboids indexed by the partition attribute are calculated. In the example provided in FIG. 2, the cuboids (A,B,C,D), (A,B,C), (A,B,D), (A,B), (A,C), (A,D), and (A) are calculated. However, tuples for other cuboids remain. Tuples will not have been calculated for cuboids that are not indexed by the first attribute of partition, such as cuboid (B,C,D).

As shown by the lattice of FIG. 2, the remaining cuboids are lower dimensionality cuboids that may be calculated from higher dimensionality cuboids. The controller 10 identifies a parent cuboid of these remaining cuboids (Step 1070). Treating the parent cuboid as a relation (Step 1080), the controller returns to Step 1000 to test the size of the parent cuboid and partition it as necessary. For these later iterations, all previous attributes of partition may be ignored when identifying paths through the search lattice to compute uncalculated data cube tuples.

At the conclusion of the second partition operation, lower dimensional cuboids may remain for calculation, such as the two dimensional (B,D) cuboid in the example of FIG. 2. Again, the controller 10 identifies a parent cuboid at Step 1070, such as (B,C,D), to calculate these remaining cuboids. The partition and computation operation is recursive; it is applied to lower dimensional cuboids as necessary to complete the data cube.

Eventually, a parent cuboid will be identified that fits within main memory 20. When the controller determines at Step 1000 that a parent cuboid fits in main memory 20, the controller 10 loads the parent cuboid into main memory 20 and computes tuples of all remaining cuboids from the parent (Step 1090). In a preferred embodiment, such computation uses the path selection operation of FIG. 6, described below. At this point, the point cuboid Ø is included in the path selection. At the conclusion of Step 1090, construction of the data cube is completed and the operation terminates.

The operation described above of partitioning data into fragments that fit within main memory 20, sorting the data fragments and calculating cuboid fragment tuples therefrom eliminates unnecessary I/O costs. Because the data fragments fit within main memory 20, the sorting process does not require data to be read from and written to secondary memory 30. When partitions fit into main memory 20, input/output costs are proportional to n, the number of dimensions of the partitioning attribute within the database R, whereas input/output costs of known prior art systems are proportional to $n^2$ or even $2^n$. Thus, the partition operation achieves substantial conservation of computation expense.

The partition operation described above does not specify exactly how to partition or how many data fragments to create. To optimize the operation in a preferred embodiment, the controller 10 may sample database R before partitioning to determine a range of values that are taken by the various attributes. The controller 10 may choose to partition by an attribute that takes relatively many values, thus dividing the database into a larger number of small data fragments. Doing so increases the likelihood that each data fragment will fit within main memory 20.

In another preferred embodiment, the partition operation may be tailored specifically for large databases. Some databases may be so large that partitioning by a single attribute is unlikely to generate a significant number of data fragments that fit within main memory 20. Accordingly, the controller 10 may partition the database R initially by two or more attributes rather than one. In the example of FIG. 2, the controller may partition based on values of A and B, rather than A alone, in a manner similar to step 1010 of FIG. 4. In this event, each data fragment contains related A and B data. Partitioning by two attributes at once creates many more data fragments than does partitioning by a single attribute and, therefore, is more likely to create data fragments that fit in main memory 20. Computation of cuboid fragments follows the procedure described above with respect to a single attribute of partition. However, computation of the cuboid fragments becomes slightly more complex because each data fragment is related by specific values of A and B. Thus, for each partition in A, the controller must calculate cuboid fragments for all partitions of B, or vice versa.

Once computed, the processor may refer to one or more tuples of the data cube to answer multiple attribute queries. The queries may identify specific values of the attributes which the processor would use to identify a set of tuples, indexed by the attributes, that are responsive to the query.

II. Conservation of Main Memory Sorting

When a relation fits entirely within main memory 20, all cuboids may be calculated within main memory 20 without resort to secondary memory 30. However, significant processing is required to build a data cube even when it fits entirely within main memory 20. The present invention achieves substantial computational savings by minimizing a number of sorts required to build the data cube based on paths through the search lattice of the cube and sharing sort results whenever possible.

Turning to the lattice of FIG. 2, assume now that the highest dimension cuboid (A,B,C,D) fits in main memory 20. As noted above, relationships among the cuboids is shown by interconnecting lines. Paths in the lattice determine which of the cuboids may be computed from the others. Computation of cuboids in each new path requires a sort of the parent cuboid at the root of the path.

Figure 6:
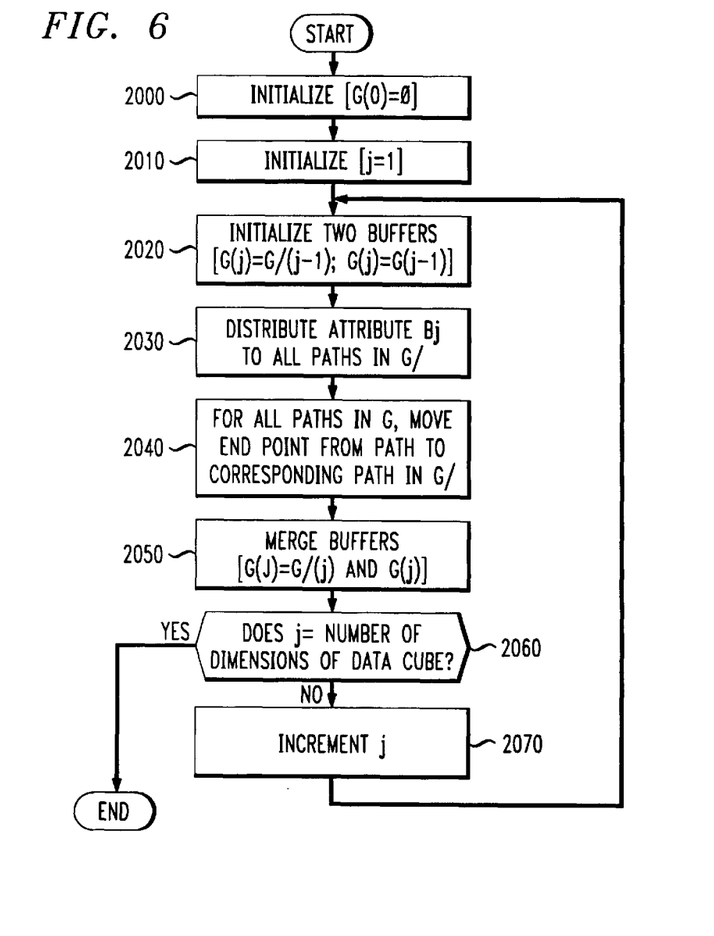
FIG. 6 is a flow diagram of operation of the controller of FIG. 3 according to a second embodiment of the present invention.

The controller 10 identifies a set of minimum paths to traverse the search lattice using the operation of FIG. 6. The controller 10 initializes the operation by defining a path defining a one-dimensional cuboid, the 0 cuboid (Step 2000). From the initialization step, the controller 10 begins an iterative operation, counting up to the number of dimensions of the data cube (j=1 to n) (Step 2000). For each dimension j, the controller 10 creates duplicates of the two paths in the immediately lower dimension (j−1), labeled for example $G_l$ (j) and $G_r$ (j) (Step 2020). The controller 10 distributes a $j^{th}$ attribute ($B_j$) to all paths identified in the first buffer, $G_l$ (j) (Step 2030). For all paths in $G_r$ (j), the controller 10 removes the end point from the path and adds the end point to the corresponding path in $G_l$ (j) (Step 2040). The controller 10 then merges the contents of the two buffers to a single set of paths (Step 2050). The iterative operation repeats (Steps 2060, 2070) until the controller 10 counts out to the number of dimensions of the data cube.

Using the example of the four dimensional data cube of FIG. 2, the following table demonstrates how the controller 10 builds the minimum set of paths necessary to traverse the data cube.

| Step 2000 | G(0) | φ |
|---|---|---|
| j = 1 | | |
| Step 2020 | Gl(1) | φ |
| | Gr(1) | φ |
| Step 2030 | Gl(1) | D |
| Step 2040 | Gl(1) | D → φ |
| | Gr(1) | |
| Step 2050 | G(1) | D → φ |
| j = 2 | | |
| Step 2020 | Gl(2) | D → φ |
| | Gr(2) | D → φ |
| Step 2030 | Gl(2) | CD → C |
| Step 2040 | Gl(2) | CD → C → φ |
| | Gr(2) | D |
| Step 2050 | G(2) | CD → C → φ |
| | | D |
| j = 3 | | |

-continued

| Step 2020 | Gl(3) | CD → C → φ |
|---|---|---|
| | | D |
| | Gr(3) | CD → C → φ |
| | | D |
| Step 2030 | Gl(3) | BCD → BC → B |
| | | BD |
| Step 2040 | Gl(3) | BCD → BC → B → φ |
| | | BD → D |
| | Gr(3) | CD → C |
| Step 2050 | G(3) | BCD → BC → B → φ |
| | | BD → D |
| | | CD → C |
| j = 4 | | |
| Step 2020 | Gl(4) | BCD → BC → B → φ |
| | | BD → D |
| | | CD → C |
| | Gr(4) | BCD → BC → B → φ |
| | | BD → D |
| | | CD → C |
| Step 2030 | Gl(4) | ABCD → ABC → AB → A |
| | | ABD → AD |
| | | ACD → AC |
| Step 2040 | Gl(4) | ABCD → ABC → AB → A → φ |
| | | ABD → AD → D |
| | | ACD → AC → C |
| | Gr(4) | BCD → BC → B |
| | | BD |
| | | CD |
| Step 2050 | G(4) | ABCD → ABC → AB → A → φ |
| | | ABD → AD → D |
| | | ACD → AC → C |
| | | BCD → BC → B |
| | | BD |
| | | CD |

Paths must share common prefixes. Accordingly, the order of sort for the paths identified at the conclusion of Step 2050 are reordered. For each path, the first attribute of the path is the attribute designated at the endpoint of the path. The second attribute is the attribute added at the second node in the path. The process repeats until the last attribute in the sort order is the attribute added at the root node of the path. In the example of the table above, the paths are resorted as follows:

ABCD → ABC → AB → A → φ
DAB → DA → D
CAD → CA → C
BCD → BC → B
BD
CD

Thus, the controller 10 identifies a set of paths for computation of all cuboids of the data cube. The set possesses the minimum number of paths necessary for computation of a complete n dimensional data cube. Of course, there is more than one set of paths containing the minimum number of paths through any particular search lattice.

In addition to identifying the minimum number of paths required to compute the data cube, the controller 10 also conserves computational resources by ordering the paths used for computation to take advantage of existing sorting relationships. For example, if sort CD is performed after sort CAD, the controller 10 need only sort each sequence of tuples in the CAD cuboid having the same C value in the D order, because the data of the CAD cuboid is sorted already in the C order. Accordingly, when performing a new sort, the controller 10 orders sort operations to conserve resources wherever possible.

The above discussion provides an apparatus and method which greatly conserve computational expenses associated with constructing data cubes from data sets. While the invention has been described as applied to relational databases, the invention is not so limited. The invention may be applied to data sets generally and not relational bases such as object-oriented data bases.

We claim:

1. A method of constructing a data cube data structure from a data set, comprising the steps of:

partitioning the data set by a first attribute into a plurality of data fragments, and for each data fragment,
determining whether the size of the data fragment exceeds a predetermined threshold, and
when the size of the data fragment does not exceed the predetermined threshold, computing cuboid tuples from the data fragment according to:
sorting data of the data fragment by a first order of attributes, and
calculating tuples for all cuboid fragments indexed by a prefix of the first sort order.

2. The method of claim 1, further comprising steps of:

when the size of the data fragment exceeds the predetermined threshold, partitioning the data fragment according to a second attribute into a plurality of sub-fragments, and
for each sub-fragment,
determining whether the size of the sub-fragment exceeds the predetermined threshold, and
when the size of the sub-fragment does not exceed the predetermined threshold, computing cuboid tuples from the sub-fragment.

3. The method of claim 2, further comprising steps of:

when the size of a sub-fragment exceeds the predetermined threshold, recursively partitioning the sub-fragment by additional attributes into other data fragments until a size of each other data fragment does not exceed the predetermined threshold, and
for each other data fragment, computing cuboid tuples from the other data fragment.

4. The method of claim 1, wherein the computing step further comprises, in the event that all tuples to be calculated from the data fragment are not calculated by the calculating step, recursively:
resorting the data fragment by additional sort orders of attributes, and
calculating tuples for all fragments indexed by prefixes of the additional sort orders until all fragments to be calculated from the data fragment are calculated.

5. The method of claim 4, wherein the sorting and resorting steps are performed to traverse a minimum number of paths through a search lattice of the data cube.

6. The method of claim 5, wherein the minimum number of paths are selected according to a method comprising the steps of:

counting out a number of dimensions equal to a number of dimensions of the data cube, and
for each counted dimension,
duplicating twice a set of paths of a search lattice for a data cube having one less dimension than the counted dimension,
distributing an attribute associated with the counted dimension to the first duplicate,
for each path in the second duplicate, moving an end point of the path to a corresponding path in the first duplicate, and
merging the paths of the first and second duplicate.

7. The method of claim 6, further comprising a step of, after all dimensions have been counted, reordering a prefix of each path in an order of end point of the path to first point of the path.

8. The method of claim 4, wherein the order of paths is chosen to possess a common prefix with a previous sort order.

9. The method of claim 1, further comprising steps of:

identifying a parent cuboid for a cuboid that remains to be calculated,
determining whether a size of the parent cuboid exceeds the predetermined threshold, and
in the event that the size of the parent cuboid exceeds the predetermined threshold,
partitioning the parent cuboid into second data fragments according to a second attribute,
for each second data fragment,
determining whether the size of the second data fragment exceeds the predetermined threshold, and
when the size of the second data fragment does not exceed the predetermined threshold, computing cuboid tuples from the second data fragment.

10. The method of claim 9, further comprising a step of in the event that the size of the parent cuboid does not exceed the predetermined threshold, calculating remaining cuboids from the parent cuboid.

11. The method of claim 10, wherein the step of calculating remaining cuboids comprises the steps of:

sorting the parent cuboid according to a first sort order,
computing uncalculated cuboids indexed by a prefix of the first sort order, and
iteratively:
resorting the parent cuboid according to additional sort orders, and
computing uncalculated cuboids indexed by a prefix of the additional sort orders until all cuboids are calculated.

12. The method of claim 11, wherein the sorting and resorting steps are performed to traverse a minimum number of paths through a search lattice of the data cube.

13. The method of claim 11, wherein the additional sort orders are chosen to possess a common prefix with a previous sort order.

14. A method of selecting a minimum number of paths necessary to traverse a search lattice of a data cube, comprising the steps of:

counting out a number of dimensions equal to a number of dimensions of the data cube, and
for each counted dimension,
duplicating twice a set of paths of a search lattice for a data cube having one less dimension than the counted dimension,
distributing an attribute associated with the counted dimension to the first duplicate,
for each path in the second duplicate, moving an end point of the path to a corresponding path in the first duplicate, and
merging the paths of the first and second duplicate; and
after all dimensions have been counted, reordering a prefix of each path in an order of end point of the path to first point of the path.

15. A data cube data structure constructed from a data set according to the method of:

partitioning the data set by a first attribute into a plurality of data fragments, and for each data fragment, determining whether the size of the data fragment exceeds a predetermined threshold, and when the size of the data fragment does not exceed the predetermined threshold, computing cuboid fragment tuples from the sorted data fragment according to:

sorting data of the data fragment by a first order of attributes, calculating tuples for all cuboid fragments indexed by a prefix of the first sort order.

16. The data cube data structure of claim 15 wherein the method further comprises steps of:

when the size of the data fragment exceeds the predetermined threshold, partitioning the data fragment according to a second attribute into a plurality of sub-fragments, and for each sub-fragment, determining whether the size of the sub-fragment exceeds the predetermined threshold, and when the size of the sub-fragment does not exceed the predetermined threshold, computing cuboid fragment tuples from the sub-fragment.

17. The data cube data structure of claim 16, wherein the method further comprises steps of:

when the size of a sub-fragment exceeds the predetermined threshold, recursively partitioning the sub-fragment by additional attributes into other data fragments until a size of each other data fragment does not exceed the predetermined threshold, and for each other data fragment, computing cuboid fragment tuples from the other data fragment.

18. The data cube data structure of claim 15, wherein the computing step further comprises in the event that all cuboid fragments to be calculated from the data fragment are not calculated by the calculating step, recursively:

resorting the data fragment by additional sort orders of attributes, and calculating tuples for all cuboid fragments indexed by prefixes of the additional sort orders until all cuboid fragments to be calculated from the data fragment are calculated.

19. The data cube data structure of claim 18, wherein the sorting and resorting steps of the method are performed to traverse a minimum number of paths through a search lattice of the data cube.

20. The data cube data structure of claim 19, wherein the minimum number of paths are selected according to a sub-method comprising the steps of:

counting out a number of dimensions equal to a number of dimensions of the data cube, and for each counted dimension, duplicating twice a set of paths of a search lattice for a data cube having one less dimension than the counted dimension, distributing an attribute associated with the counted dimension to the first duplicate, for each path in the second duplicate, moving an end point of the path to a corresponding path in the first duplicate, and merging the paths of the first and second duplicate.

21. The data cube data structure of claim 20, wherein the sub-method further comprises a step of, after all dimensions have been counted, reordering a prefix of each path in an order of end point of the path to first point of the path.

22. The data cube data structure of claim 21, further comprising a step of in the event that the size of the parent cuboid does not exceed the predetermined threshold, calculating remaining cuboids from the parent cuboid.

23. The data cube data structure of claim 18, wherein the additional sort orders are chosen to possess a common prefix with a previous sort order.

24. The data cube structure of claim 23, wherein the step of calculating remaining cuboids comprises the steps of:

sorting the parent cuboid according to a first sort order, computing uncalculated cuboids indexed by a prefix of the first sort order, recursively, resorting the parent cuboid according to additional sort orders, and computing uncalculated parent cuboids indexed by a prefix of the additional sort orders until all cuboids are calculated.

25. The data cube data structure of claim 24, wherein the sorting and resorting steps are performed to traverse a minimum number of paths through a search lattice of the data cube.

26. The data cube data structure of claim 24, wherein the additional sorts orders are chosen to possess a common prefix with a previous sort order.

27. The data cube data structure of claim 15 further comprising the steps of:

identifying a parent cuboid for an uncalculated cuboid;

determining whether a size of the parent cuboid exceeds the predetermined threshold, and in the event that the size of the parent cuboid exceeds the predetermined threshold, partitioning the parent cuboid into second data fragments according to a second attribute, for each second data fragment, determining whether the size of the second data fragment exceeds the predetermined threshold, and when the size of the second data fragment does not exceed the predetermined threshold, computing cuboid fragment tuples from the second data fragment.

28. A method of calculating a data cube from a data set, comprising the steps of:

identifying a minimum number of paths necessary to traverse a search lattice representing the data cube, wherein each of the minimum paths is characterized by a root node of the path, and for each identified path, calculating the data cube from the data set indexed by each of the identified paths including, for each path:

sorting data of a cuboid that is a parent to the root node by a sort order identifying the path, and calculating cuboids indexed by the sort order, wherein tuples of each cuboid indexed by one of the minimum paths are calculated in unison.

29. A data cube data structure constructed from a data set according to the method of:

identifying a minimum number of paths necessary to traverse a search lattice representing the data cube, wherein each of the minimum paths is characterized by a root node of the path, and calculating cuboids indexed by each of the identified paths including, for each path:

sorting data of a cuboid that is a parent to the root node by a sort order identifying the path, and calculating cuboids indexed by the sort order, wherein tuples of each cuboid indexed by one of the minimum paths are calculated in unison.

30. A method for performing a multiple attribute query on a data set in a memory, comprising the steps of:

determining whether a size of the data set exceeds a predetermined threshold;

when the size exceeds the predetermined threshold:

partitioning the data set by a first attribute into a plurality of data fragments, and computing cuboid tuples from the data fragments according to;

sorting data of the data fragment by a first order of attributes, calculating tuples for all cuboid fragments indexed by a prefix of the first sort order, and identifying cuboid tuples responsive to the query.

31. The method of claim 30, wherein the attribute of partition is selected independently from the query.

32. The method of claim 30, wherein the computing step further, comprises in the event that all tuples to be calculated from the data fragment are not calculated by the calculating step, recursively:

resorting the data fragment by additional sort orders of attributes, and calculating tuples for all fragments indexed by prefixes of the additional sort orders until all fragments to be calculated from the data fragment are calculated.

33. The method of claim 32, wherein the sorting and resorting steps are performed to traverse a minimum number of paths through a search lattice of the data cube.

34. The method of claim 33, wherein the minimum number of paths are selected according to a method comprising the steps of:

counting out a number of dimensions equal to a number of dimensions of the data cube, and for each counted dimension:

duplicating twice a set of paths of a search lattice for a data cube having one less dimension than the counted dimension, distributing an attribute associated with the counted dimension to the first duplicate, for each path in the second duplicate, moving an end point of the path to a corresponding path in the first duplicate, and merging the paths of the first and second duplicate.

35. The method of claim 34, further comprising a step of, after all dimensions have been counted, reordering a prefix of each path in an order of end point of the path to first point of the path.

36. The method of claim 34, wherein an order of paths is chosen to possess a common prefix with a previous sort order.

37. Apparatus for performing a multiple attribute query on a data set, comprising:

a first memory for storing the data set, a second memory that implements data storage and retrieval faster than the first memory, and processor in communication with the first and second memories, wherein:

the processor determines whether the data set fits within the second memory, when the data set does not fit within the second memory, the processor partitions the data set into a plurality of data fragments by a first attribute, for each data fragment, the processor loads the data fragment into the second memory, and the processor computes cuboid tuples from the loaded data fragment according to:

sorting data of the data fragment by a first order of attributes, calculating tuples for all cuboid fragments indexed by a prefix of the first sort order wherein certain of the computed cuboid tuples are responsive to the query.

38. Apparatus of claim 37, wherein the processor selects an attribute of partition independently from attributes defined in the query.

39. Apparatus of claim 37, wherein the processor further computes cuboid tuples according to, in the event that all tuples to be calculated from the data fragment are not calculated by the calculating step, recursively:

resorting the data fragment by additional sort orders of attributes, and calculating tuples for all fragments indexed by prefixes of the additional sort orders until all fragments to be calculated from the data fragment are calculated.

40. Apparatus of claim 39, wherein the processor performs the sorting and resorting steps to traverse a minimum number of paths through a search lattice of the data cube.

41. Apparatus of claim 40, wherein the processor selects the minimum number of paths according to the steps of:

counting out a number of dimensions equal to a number of dimensions of the data cube, and for each counted dimension:

duplicating twice a set of paths of a search lattice for a data cube having one less dimension than the counted dimension, distributing an attribute associated with the counted dimension to the first duplicate, for each path in the second duplicate, moving an end point of the path to a corresponding path in the first duplicate, and merging the paths of the first and second duplicate.

* * * * *